US008477803B2

(12) United States Patent
Kent et al.

(10) Patent No.: US 8,477,803 B2
(45) Date of Patent: *Jul. 2, 2013

(54) METHOD AND SYSTEM FOR IMPLEMENTING A SINGLE WEIGHT (SW) SINGLE CHANNEL (SC) MIMO SYSTEM WITH NO INSERTION LOSS

(75) Inventors: Mark Kent, Vista, CA (US); Vinko Erceg, Cardiff, CA (US); Uri M. Landau, San Diego, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,275

(22) Filed: Dec. 13, 2011

(65) Prior Publication Data

US 2012/0082270 A1   Apr. 5, 2012

Related U.S. Application Data

(63) Continuation of application No. 11/173,304, filed on Jun. 30, 2005, now Pat. No. 8,098,683.

(60) Provisional application No. 60/616,292, filed on Oct. 6, 2004.

(51) Int. Cl.
*H04W 4/00* (2009.01)
*H04J 3/00* (2006.01)
*H04B 1/10* (2006.01)
*H04B 7/10* (2006.01)
*H04L 1/02* (2006.01)

(52) U.S. Cl.
USPC ........... 370/464; 370/328; 455/101; 455/132; 455/139; 375/347

(58) Field of Classification Search
USPC ........... 455/69, 101, 132, 136–140, 272–273; 370/328, 338, 334, 464; 375/148, 144, 347, 375/349
See application file for complete search history.

(56) References Cited

U.S. PATENT DOCUMENTS 4,160,952 A   7/1979 Seastrand, Jr.
4,369,520 A   1/1983 Cerny et al.
(Continued)

OTHER PUBLICATIONS

Jan Mietzner and Peter A. Hoeher. University of Kiel, Adaptive Antennas and MIMO Systems for Wireless Communications, Boosting the Performance of Wireless Communication Systems: Theory and Practice of Multiple•Antenna Techniques, IEEE Communications Magazine, Oct. 2004, pp. 40-47.

(Continued)

*Primary Examiner* — Wesley Kim
(74) *Attorney, Agent, or Firm* — Sterne, Kessler, Goldstein & Fox P.L.L.C.

(57) ABSTRACT

In a RF communications system, aspects for implementing a single weight single channel MIMO system with no insertion loss may comprise generating at least one control signal that is utilized to control at least one of a plurality of received signals in a WCDMA and/or HSDPA system. A phase of a first of the plurality of received signals may be adjusted outside of a first processing path used to process that signal so that it is equivalent to a phase of at least a second of the plurality of received signals. A gain in the first processing path may be equivalent to a gain in a second processing path that is utilized to process the second of the plurality of received signals. The control signal may be utilized to adjust a phase and/or an amplitude of at least one of a plurality of received signals.

19 Claims, 7 Drawing Sheets

U.S. PATENT DOCUMENTS

| | | | |
|---|---|---|---|
| 4,397,036 | A | 8/1983 | Hirade et al. |
| 5,991,612 | A | 11/1999 | Saito |
| 6,029,056 | A | 2/2000 | Kiyanagi et al. |
| 6,340,883 | B1 | 1/2002 | Nara et al. |
| 7,116,651 | B2 | 10/2006 | Hakkinen et al. |
| 7,184,500 | B2 * | 2/2007 | Li et al. .................. 375/347 |
| 7,324,794 | B2 | 1/2008 | Chari et al. |
| 7,542,446 | B2 | 6/2009 | Mehta et al. |
| 2001/0048724 | A1 | 12/2001 | Subramanian |
| 2002/0173302 | A1 | 11/2002 | Baker et al. |
| 2003/0007450 | A1 | 1/2003 | Ohtaki |
| 2003/0022648 | A1 | 1/2003 | Wight |
| 2005/0243898 | A1 | 11/2005 | Reznik et al. |
| 2006/0072629 | A1 | 4/2006 | Kent et al. |

OTHER PUBLICATIONS

Simon Haykin, McMaster University; Mathini Sellathurai, Yvo De Jong, and Tricia Willink, Communications Research Centre Canada, Adaptive Antennas and MIMO Systems for Wireless Communications, Turbo•MIMO for Wireless Communications, IEEE Communications Magazine, Oct. 2004, pp. 48•53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54•59.

Quentin H. Spencer, Distribution Control Systems, Inc .. Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, an Introduction to the Multi-User MIMO Downlink, IEEE Communications Magazine, Oct. 2004. pp. 60-67.

Shahab Sanayei and Aria Nosratinia, University of Texas at Dallas, Adaptive Antennas and MIMO Systems for Wireless Communications, Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

* cited by examiner

METHOD AND SYSTEM FOR IMPLEMENTING A SINGLE WEIGHT (SW) SINGLE CHANNEL (SC) MIMO SYSTEM WITH NO INSERTION LOSS

CROSS-REFERENCE TO RELATED APPLICATIONS/INCORPORATION BY REFERENCE

The present application is a CONTINUATION OF U.S. application Ser. No. 11/173,304, filed Jun. 30, 2005. Said U.S. application Ser. No. 11/173,304 claims benefit from and priority to U.S. Application No. 60/616,292, filed Oct. 6, 2004. The above-identified applications are hereby incorporated herein by reference in their entirety.

The present application is related to the following applications, each of which is incorporated herein by reference in its entirety:

U.S. patent application Ser. No. 11/173,870, filed Jun. 30, 2005;

U.S. patent application Ser. No. 11/174,303, filed Jun. 30, 2005, now issued U.S. Pat. No. 7,643,839.

U.S. patent application Ser. No. 11/173,502, filed Jun. 30, 2005;

U.S. patent application Ser. No. 11/173,871, filed Jun. 30, 2005, now issued U.S. Pat. No. 7,894,507;

U.S. patent application Ser. No. 11/173,964, filed Jun. 30, 2005, now issued U.S. Pat. No. 7,787,520;

U.S. patent application Ser. No. 11/173,252, filed Jun. 30, 2005, now issued U.S. Pat. No. 7,471,694;

U.S. patent application Ser. No. 11/174,252, filed Jun. 30, 2005;

U.S. patent application Ser. No. 11/172,756, filed Jun. 30, 2005, now issued U.S. Pat. No. 7,522,562;

U.S. patent application Ser. No. 11/173,305, filed Jun. 30, 2005;

U.S. patent application Ser. No. 11/172,759, filed Jun. 30, 2005, now issued U.S. Pat. No. 7,483,675;

U.S. patent application Ser. No. 11/173,689, filed Jun. 30, 2005;

U.S. patent application Ser. No. 11/173,129, filed Jun. 30, 2005, now issued U.S. Pat. No. 7,991,361;

U.S. patent application Ser. No. 11/172,779, filed Jun. 30, 2005, now issued U.S. Patent No. 7,586,886;

U.S. patent application Ser. No. 11/172,702, filed Jun. 30, 2005, no issued U.S. Patent No. 7,593,493;

U.S. patent application Ser. No. 11/173,727, filed Jun. 30, 2005;

U.S. patent application Ser. No. 11/173,726, filed Jun. 30, 2005;

U.S. patent application Ser. No. 11/172,781, filed Jun. 30, 2005;

U.S. patent application Ser. No. 11/174,067, filed Jun. 30, 2005;

U.S. patent application Ser. No. 11/173,854, filed Jun. 30, 2005, now issued U.S. Pat. No. 7,983,323;

U.S. patent application Ser. No. 11/173,911, filed Jun. 30, 2005, now issued U.S. Pat. No. 8,023,554; and U.S. patent application Ser. No. 11/174,403, filed Jun. 30, 2005, now issued U.S. Pat. No. 7,860,199.

This application is also related to the following applications, each of which is incorporated herein by reference in its entirety:

U.S. patent application Ser. No. 12/652,393, filed Jan. 5, 2010;

U.S. patent application Ser. No. 12/871,550, filed Aug. 30, 2010, now issued U.S. Pat. No. 8,081,672;

U.S. patent application Ser. No. 12/343,955, filed Dec. 24, 2008, now issued U.S. Pat. No. 7,885,288;

U.S. patent application Ser. No. 13/022,841, filed Feb. 8, 2011;

U.S. patent application Ser. No. 12/427,206, filed Apr. 21, 2009 now issued U.S. Pat. No. 7,995,537;

U.S. patent application Ser. No. 13/206,221, filed Aug. 9, 2011;

U.S. patent application Ser. No. 12/360,730, filed Jan. 27, 2009, now issued U.S. Pat. No. 7,881,673;

U.S. patent application Ser. No. 13/190,085, filed Jul. 25, 2011;

U.S. patent application Ser. No. 12/553,585, filed Sep. 3, 2009, now issued U.S. Pat. No. 7,865,162;

U.S. patent application Ser. No. 12/984,089, filed Jan. 4, 2011;

U.S. patent application Ser. No. 12/564,681, filed Sep. 22, 2009;

U.S. patent application Ser. No. 13/185,297, filed Jul. 18, 2011;

U.S. patent application Ser. No. 13/237,717, filed Sep. 20, 2011; and

U.S. patent application Ser. No. 12/404,564, filed Mar. 16, 2009, now issued U.S. Pat. No. 7,860,199.

FIELD OF THE INVENTION

The present invention relates to communication receivers and, more particularly, to a system and method for implementing a single weight single channel MIMO system with no insertion loss.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1a is a technology timeline indicating evolution of existing WCDMA specification to provide increased downlink throughput. Referring to FIG. 1a, there is shown data rate spaces occupied by various wireless technologies, including General Packet Radio Service (GPRS) 100, Enhanced Data rates for GSM (Global System for Mobile communications)

Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the WCDMA family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 Kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals can be combined in several ways, from which maximal ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI and inter-path interference (IPI). The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

To combat MAI, linear interference suppression algorithms can be utilized, which are based on linear channel equalization and are suitable for WCDMA/HSDPA systems using long, orthogonal scrambling codes. Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M-1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for implementing a single weight (SW) single channel (SC) MIMO system with no insertion loss, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a system and method for implementing a single weight single channel MIMO system with no insertion loss. Single weight information may be generated for each RF chain of each of a plurality of receive antennas. The Single weight information may be utilized to adjust a phase and/or amplitude of RF signals in the RF chain, and the adjusted RF signals from the RF chains may be combined to form a stronger signal. The adjustment of phase and/or amplitude may be accomplished outside the RF chain in order to prevent the introduction of insertion loss by additional electrical components.

Figure 1A:
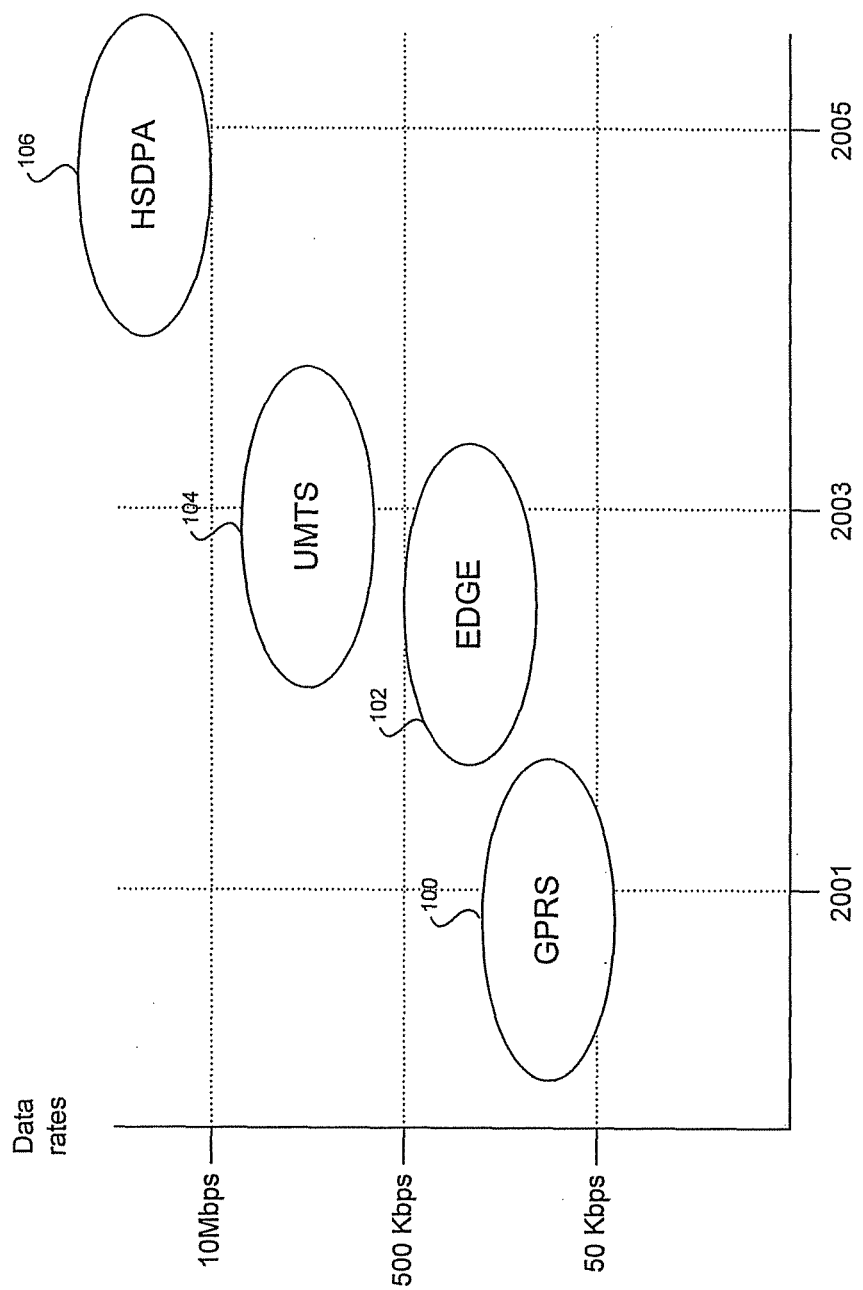
FIG. 1a is a technology timeline indicating evolution of existing WCDMA specification to provide increased downlink throughput.
Figure 1B:
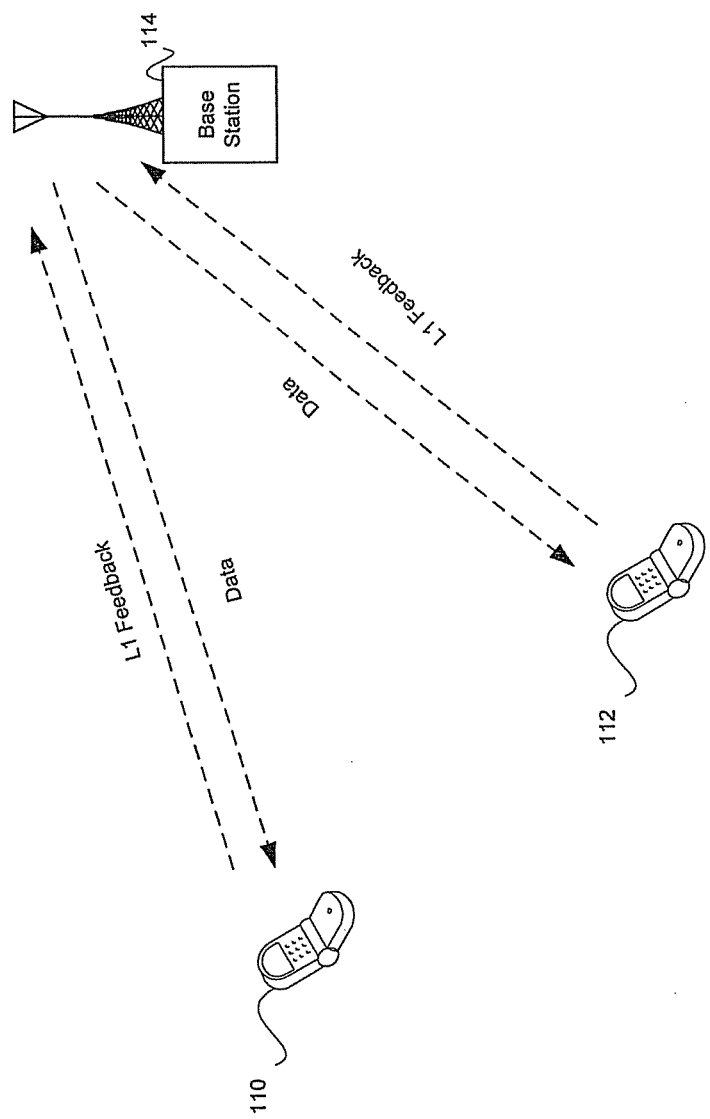
FIG. 1b illustrates an exemplary High Speed Downlink Packet Access (HSDPA) distributed architecture that achieves low delay link adaptation, in connection with an embodiment of the invention.

FIG. 1b illustrates an exemplary HSDPA distributed architecture that achieves low delay link adaptation, in connection with an embodiment of the invention. Referring to FIG. 1b, there is shown terminals 110 and 112 and a base station (BS) 114. HSDPA is built on a distributed architecture that achieves low delay link adaptation by placing key processing at the BS 114, which may be a medium access control (MAC), closer to the physical layer (PHY) air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
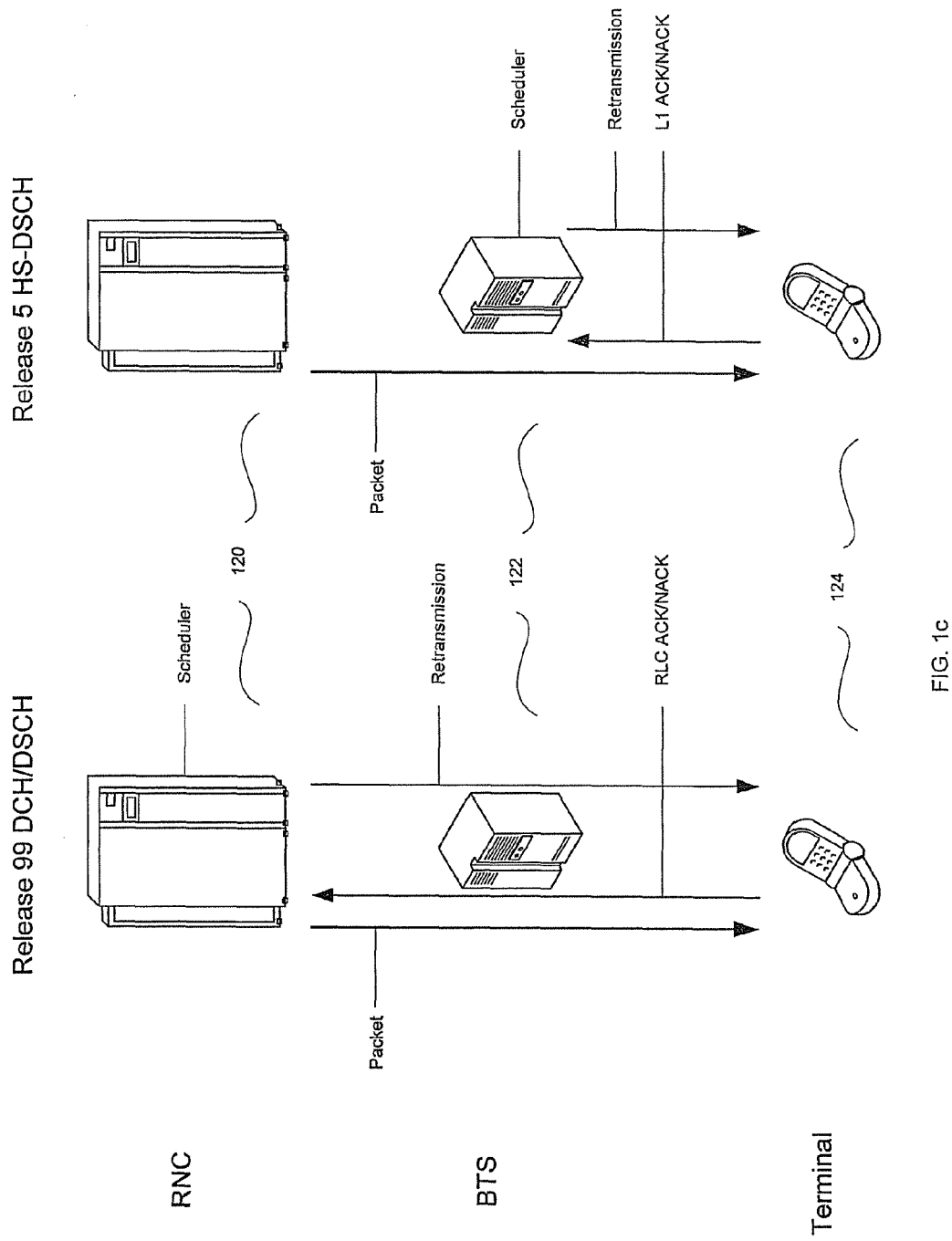
FIG. 1c illustrates an exemplary Layer 1 HARQ control situated in a base station to remove retransmission-related scheduling and storing from the radio network controller, in connection with an embodiment of the invention.

FIG. 1c illustrates an exemplary Layer 1 HARQ control situated in a base station to remove retransmission-related scheduling and storing from the radio network controller, in connection with an embodiment of the invention. Referring to FIG. 1 c, there is shown a hybrid automatic repeat request (HARQ) operation, which is an operation designed to reduce the delay and increase the efficiency of retransmissions. Layer 1 HARQ control is situated in the Node B, or base station (BS) 122, thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal (124) may request the retransmission of the data packets. While current-generation WCDMA networks handle those retransmission requests through the radio network controller, HSDPA retransmission requests are managed at the base station. Using this approach, packets are combined at the physical (PHY) layer and the mobile terminal stores the received data packets in soft memory. If decoding has failed, the new transmission is combined with the old transmission before channel decoding. The HSDPA approach allows previously transmitted bits from the original transmission to be combined with the retransmission. This combining strategy provides improved decoding efficiencies and diversity gains while minimizing the need for additional repeat requests.

While the spreading factor may be fixed, the coding rate may vary between 1/4 and 3/4, and the HSDPA specification supports the use of five, 10 or 15 multicodes. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms frame length, compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may supports 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
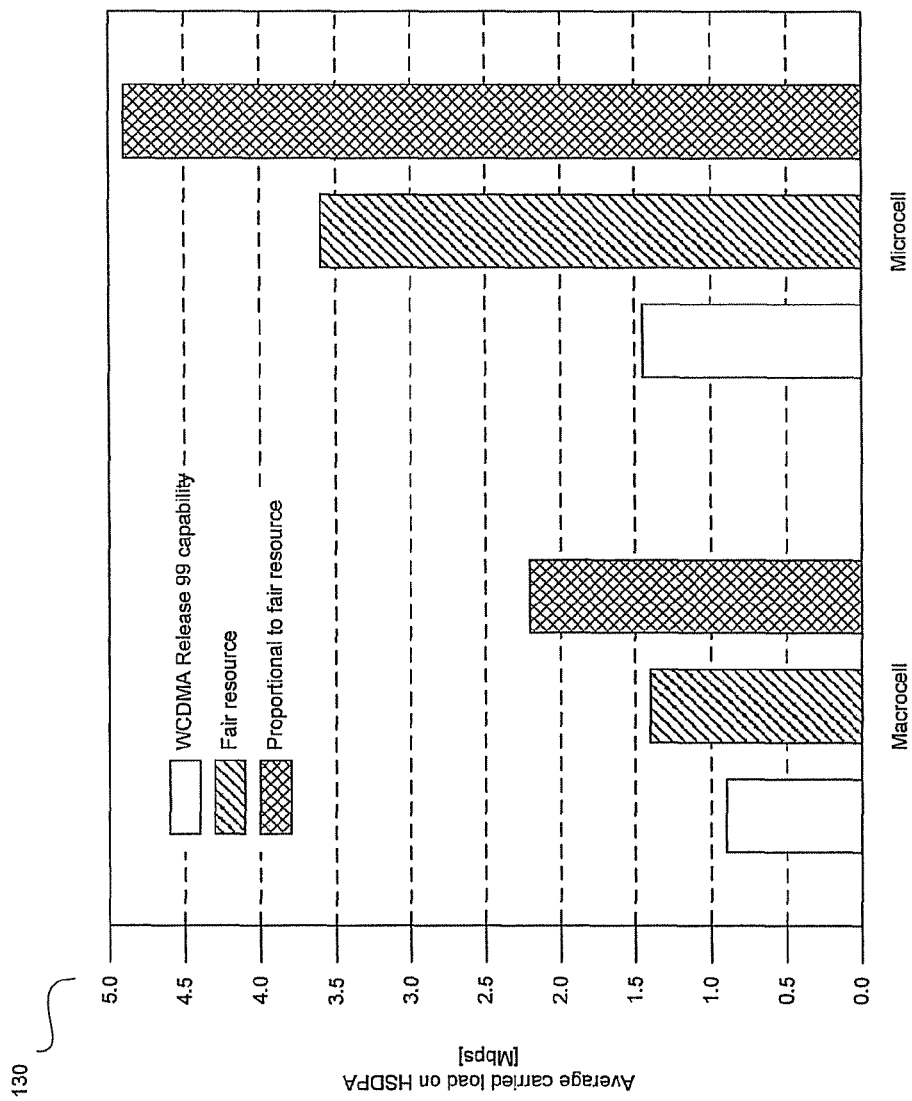
FIG. 1d is a chart illustrating exemplary average carried loads for HSDPA-based macrocell and microcell systems, in connection with an embodiment of the invention.

FIG. 1d is a chart illustrating exemplary average carried loads for HSDPA-based macrocell and microcell systems, in connection with an embodiment of the invention. Referring to chart 130 in FIG. 1d, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 2:
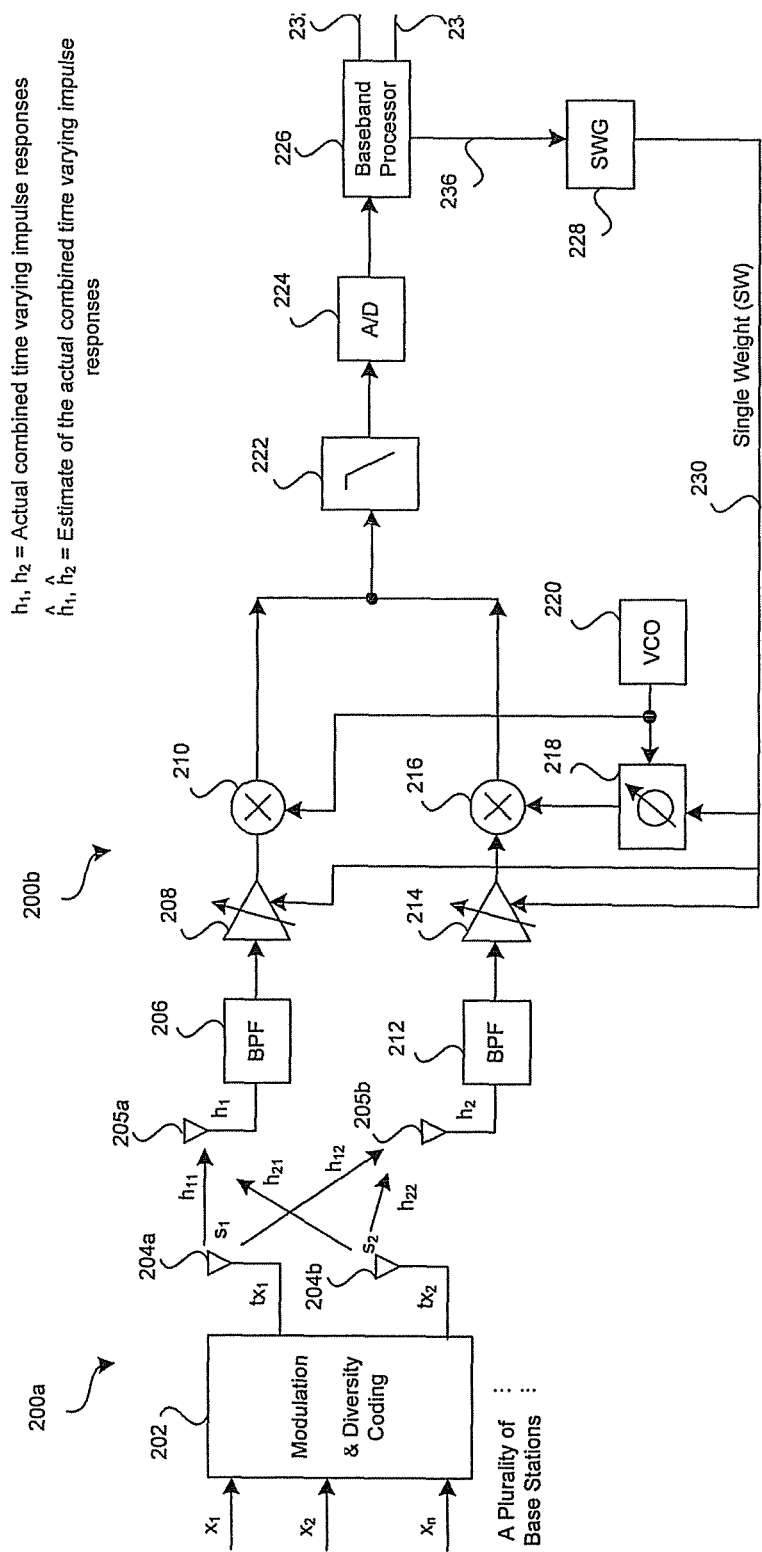
FIG. 2 is a block diagram of exemplary single weight single channel system for WCDMA, in accordance with an embodiment of the invention.

FIG. 2 is a block diagram of exemplary single weight single channel system for WCDMA, in accordance with an embodiment of the invention. Referring to FIG. 2, there is shown a transmitter section 200a and a receiver section 200b. The transmitter section 200a may comprise a modulation and diversity coding block 202 and transmit antennas 204a and 204b. Data inputs $x_1, x_2, \ldots x_n$, may be inputs to the modulation and diversity coding block 202. RF signals $tx_1$ and $tx_2$ may be output signals from the modulation and diversity coding block 202. The receiver section 200b may comprise receive antennas 205a and 205b, bandpass filters (BPF) 206 and 212, variable gain low-noise amplifiers (LNA) 208 and 214, mixers 210 and 216, a phase shifter block 218, a voltage controlled oscillator (VCO) 220, a low pass filter (LPF) 222, an analog-to-digital converter (ADC) 224, a digital baseband processor 226 and a single weight generator (SWG) 228. The combined time varying impulse responses of the propagation paths, or propagation channels, taken by the signals received by receive antennas, for example, the receive antennas 205a and 205b, may be represented by $h_1$ and $h_2$, respectively, per base station. The estimates of the combined time varying impulse responses $h_1$ and $h_2$ may be represented by $\hat{h}_1$ and $\hat{h}_2$, respectively, per base station.

In the transmitter section 200a, the modulation and diversity coding block 202 may be adapted to generate the RF signals $tx_1$ and $tx_2$ from the data inputs $x_1, x_2, \ldots, x_3$. The transmit antennas 204a and 204b may transmit the RF signals $tx_1$ and $tx_2$, and the transmitted RF signals may be represented by s1 and s2, respectively.

In an exemplary embodiment of the invention, the phase shifter block 218 and the VCO 220 may be implemented outside the receive path of the receiver section 200b and mixers 210 and 216 may be implemented within the receive path of the receiver section 200b. In this manner, no insertion loss may be introduced by the phase shifter block 218 and the VCO 220 in the exemplary embodiment for single weight system.

The receiver section 200b may comprise suitable logic, circuitry, and/or code that may be adapted to receive RF signals, convert the RF signals to digital baseband signals, and process the digital baseband signals to output voice and/or data signals that may be suitable for further digital processing. Specifically, the BPFs 206 and 212 may comprise suitable logic and/or circuitry that may be adapted to receive an input signal, limit the frequencies of the input signal to a pre-determined band of frequencies, and output that band of frequencies. The LNAs 208 and 214 may comprise suitable logic and/or circuitry that may be adapted to amplify an input signal while introducing very little noise to the signal. The amplification provided by the LNAs 208 and 214 may be controlled by an input control signal. For example, since the signals received at a receive antenna may be as weak as six millivolts (6 mV), the LNA may be adapted to amplify these signals while adding very little additional noise to the signal being amplified. The mixers 210 and 216 may comprise suitable logic and/or circuitry that may be adapted to mix an input signal with a local oscillator signal to generate an output signal. The generated output signal may have a frequency that is a difference of the input signal frequency and the local oscillator frequency from the VCO 220.

The phase shifter block 218 may comprise suitable logic, circuitry, and/or code that may be adapted to receive an input signal, adjust the phase and/or the amplitude of the input signal, and then output the adjusted signal. The phase and/or the amplitude adjustment may be indicated by a control signal input, which may be a single weight signal. The VCO 220 may comprise suitable logic and/or circuitry that may be adapted to output a signal of a specific frequency which may be pre-determined, or controlled by a voltage signal input to the VCO 220.

The LPF 222 may comprise suitable logic and/or circuitry that may be adapted to receive an input signal, limit the frequencies of the input signal to a pre-determined range of frequencies up to a certain upper limit frequency, and output that range of frequencies. The ADC 224 may comprise suitable logic, circuitry, and/or code that may be adapted to receive an analog signal, sample the analog signal at a defined rate, and output the sampled digital signal.

The digital baseband processor 226 may comprise suitable logic, circuitry, and/or code that may be adapted to process a digital signal and generate output signals 236 that may be utilized to generate a single weight signal to control the phase and/or the amplitude of a signal being processed by the phase shifter block 218. These output signals 236 may be the channel estimates $\hat{h}_1$ and $\hat{h}_2$ and a timing signal T that may be generated to specify the location of signal clusters in time domain. The digital baseband processor 226 may also be adapted to output a voice signal 232 and/or a data signal 234, which may be further processed by, for example, a vocoder and a digital display processor, respectively. The SWG 228 may comprise suitable logic, circuitry, and/or code that may be adapted to generate a single weight signal that may be communicated to the phase shifter block 218 and/or to the LNAs 208 and 214.

In operation, the modulation and diversity coding block 202 may be adapted to modulate the input data signals $x_1, x_2, \ldots x_n$ to generate the RF signals $tx_1$ and $tx_2$. The RF signals $tx_1$ and $tx_2$ may be transmitted via transmit antennas 204a and 204b, and the transmitted RF signals may be $s_1$ and $s_2$, respectively. A propagation path, or propagation channel, from a transmit antenna, for example, the transmit antenna 204a, to a receive antenna, for example, the receive antenna 205b, may have a corresponding time varying impulse response $h_{xy}$, where the subscripts x and y may indicate a specific transmit antenna and a specific receive antenna, respectively. For example, the transmitted RF signals $s_1$ and $s_2$ may propagate to the receive antennas 205a and 205b. The transmitted output signal $s_1$ may take a specific propagation channel from the transmit antenna 204a to the receive antenna 205a, and this propagation channel may have a time varying impulse response of $h_{11}$. Similarly, $h_{12}$ is the time varying impulse response of the propagation channel between the transmit antenna 204a and the receive antenna 205b for the signal $s_1$. Likewise, the transmitted output signal $s_2$ may propagate from the transmit antenna 204b to the receive antenna 205a, and that propagation channel may have a time varying impulse response of $h_{21}$, and a propagating channel from the transmit antenna 204b to the receive antenna 205b may have a time varying impulse response of $h_{22}$.

A transmitted signal, for example, the transmitted signal $s_2$, may take multiple propagation channels in propagating from a transmitting antenna, for example, the transmit antenna 204b, to a receiving antenna, for example, the receive antenna 205a. The multiple propagation channels may occur because the signal $s_2$ may propagate in a direct line from the transmit antenna 204b to the receive antenna 205a, and/or it may reflect off various objects, such as, for example, building, hills, trees, the ground, and moving vehicles, thereby taking different paths before being received by the receive antenna 205a. Each propagation channel may have a specific time varying impulse response. Each of the signals propagated via one of the multiple propagation channels may be called a multipath signal. Therefore, each propagation channel associated with each multipath signal received by the receive antenna 205b has an actual time varying impulse response. The time varying impulse responses associated with all the multipath signals may be combined together to form an aggregate time varying impulse response. For example, the time varying impulse response $h_{21}$ may be the combined time varying impulse responses associated with all multipaths for a transmitted signal, $s_2$, that propagates from the transmit antenna 204b to the receive antenna 205a.

The time varying impulse response $h_1$ may be a combined time varying impulse response of the time varying impulse responses $h_{11}$ and $h_{21}$, and the time varying impulse response $h_2$ may be the combined time varying impulse response of the time varying impulse responses $h_{12}$ and $h_{22}$. A communication channel that utilizes diversity mode transmission may transmit from a plurality of transmitting antennas, for example, the transmit antennas 204a and 204b, and the signals transmitted may be received by a plurality of receive antennas, for example, the receive antennas 205a and 205b. Therefore, the time varying impulse response of that communication channel may be the time varying impulse response $h_1$ combined with the time varying impulse response $h_2$. The following equations may describe the combined time varying impulse responses $h_1$ and $h_2$:

$$h_1 = h_{11} + h_{12}$$

$$h_2 = h_{21} + h_{22}$$

The transmitted RF signals $s_1$ and $s_2$ may be received by the receive antennas 205a and 205b. The signals received by the receive antennas 205a and 205b may be bandpass filtered by BPFs 206 and 212, respectively, and then amplified by the LNAs 208 and 214, respectively. An amplified signal at an output of the LNA 208 may be mixed with the output of the VCO 220, and the output of the LNA 214 may be mixed with the output of the phase shifter block 218. The input to the phase shifter block 218 may be the output signal generated by the VCO 220.

The amplitude of the outputs of the LNAs 208 and 214 may be adjusted by the LNAs 208 and 214, respectively, based on the single weight (SW) signal 230 generated by the SWG 228. The amplitude and/or the phase of the output signal of the VCO 220 may be adjusted by the phase shifter block 218 based on the single weight (SW) signal 230 generated by the SWG 228. The signals at the outputs of the mixers 210 and 216 may be combined, and the resulting signal may be communicated to an input of the LPF 222. The LPF 222 may low-pass filter the combined signal, and a resulting filtered signal output of the LPF 222 may be converted to a digital signal by the ADC 224. The resulting digital output signal generated by the ADC 224 may be communicated to an input of the digital baseband processor 226. The digital baseband processor 226 may further process the digital signal to generate a voice signal 232 and a data signal 234. The voice signal 232 may be further processed by, for example, a vocoder, or other voice processing device or voice processing system, and the data signal 234 may be further processed by, for example, a display processor.

In addition, the baseband processor 226 may generate output signals 236 that may be utilized by the SWG 228 to generate a single weight (SW) signal 230. The output signals 236 may be the channel estimates $\hat{h}_1$ and $\hat{h}_2$ and a timing signal T that may be generated to specify the location of signal clusters in time domain. U.S. application Ser. No. 11/173,854 provides a detailed description of signal clusters and is hereby incorporated herein by reference in its entirety. The single weight (SW) signal 230 may communicate address and/or data to a plurality of blocks, for example, the VCO block 220 and the LNA blocks 208 and 214. The SWG 228 may communicate an address via the single weight (SW) signal 230, where the address may indicate a specific block. Data may then be communicated to, and received by, the addressed block. The data may indicate, for example, the amplification level to the LNA 208 or 214, or phase adjustment to the phase shifter block 218.

Figure 3:
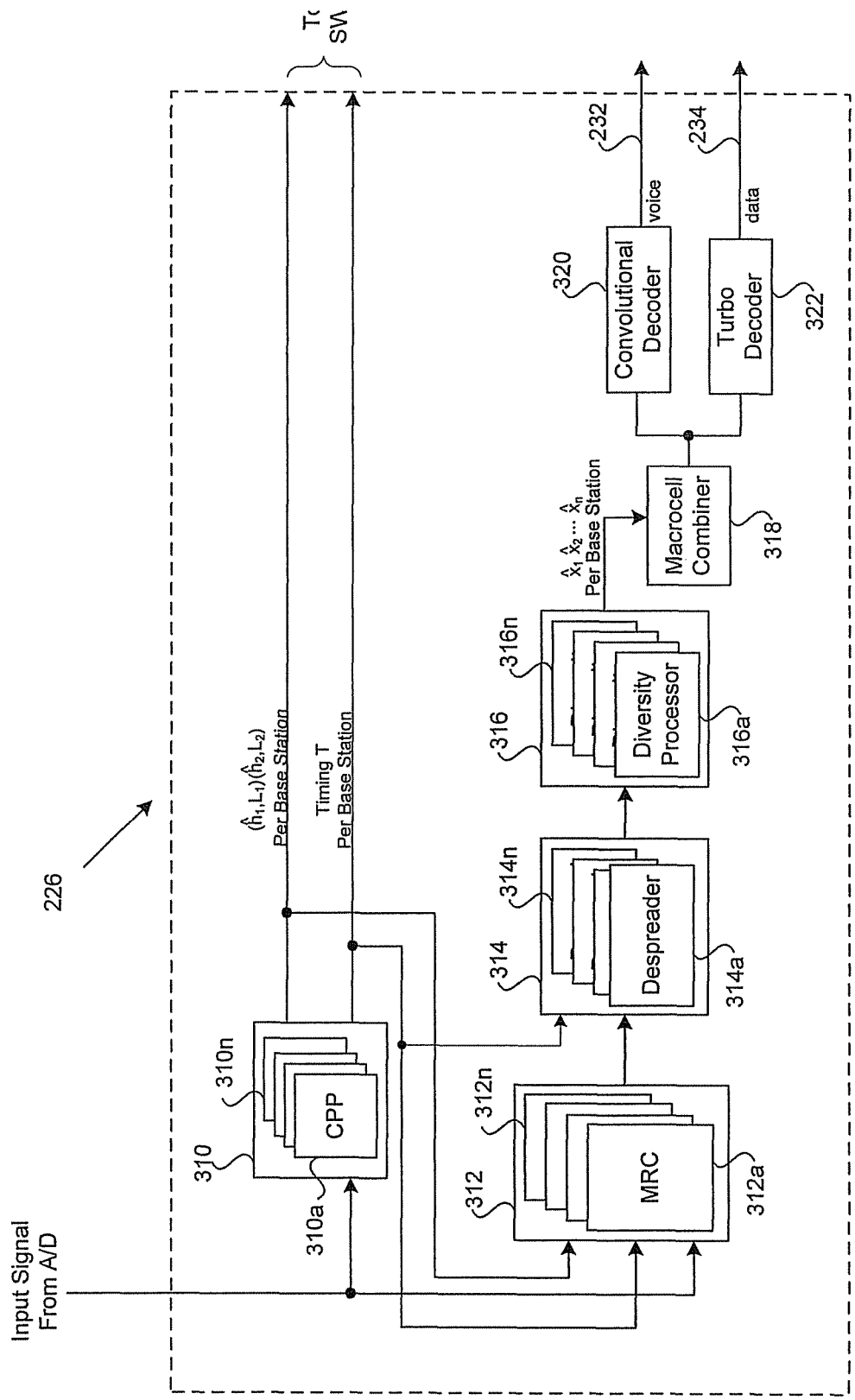
FIG. 3 is a block diagram of the exemplary digital baseband processor of FIG. 2, for example, in accordance with an embodiment of the invention.

FIG. 3 is a block diagram of the exemplary baseband processor of FIG. 2, for example, in accordance with an embodiment of the invention. Referring to FIG. 3, there is shown a digital baseband processor block 226 that comprises a cluster path processor (CPP) block 310, a maximum ratio combiner (MRC) block 312, a despreader block (DS) 314, a diversity processor (DP) block 316, a macrocell combiner block 318, a convolutional decoder block 320, and a turbo decoder block 322.

The digital baseband processor block 226 may comprise suitable logic, circuitry, and/or code that may be adapted to process a digital baseband signal to generate time varying impulse response estimates $\hat{h}_1$ and $\hat{h}_2$ of the time varying impulse responses $h_1$ and $h_2$, respectively, a timing signal T, a voice signal 232, and a data signal 234. Specifically, the CPP block 310 may comprise CPPs 310a, . . . , 310n. In one embodiment of the invention, the CPPs in the CPP block 310 may be partitioned into pairs. In this regard, each CPP may be adapted to time-wise track clusters of signals and to estimate the complex phase and amplitude of the signals in the signal clusters. The signal cluster may comprise an aggregate of received signal paths with maximum time difference that may be $16/(3.84 \times 10^6)$ seconds, for example. The signals in the signal clusters may be multipath signals.

The CPPs may be partitioned into pairs since the WCDMA standard allows diversity transmit modes where the RF signal may be transmitted by two antennas at each base station. The diversity transmit modes may comprise closed loop 1 mode (CL1), closed loop 2 mode (CL2), and open loop mode (OL) that may also be referred to as space-time transmit diversity (STTD). The CPP block 310 may be adapted to determine time varying channel impulse response estimates and lock indicators $(\hat{h}_1, L_1)$ and $(\hat{h}_2, L_2)$ per base station of the actual time varying impulse responses $h_1$ and $h_2$, respectively, and recover information transmitted by the base stations on a per base station basis. The lock indicators $L_1$ and $L_2$ may provide an indication of which components in the corresponding estimates may comprise valid component values. An embodiment of the invention may use a strength of received signal to assert the lock indicators.

The MRC block 312 may comprise a plurality of MRCs, namely 312a, . . . , 312n. Cluster timing and estimates of the time varying impulse response of the channel may be provided to the MRC block 312 on a per base station basis. The MRC block 312 may be adapted to provide a simplified and effective combining scheme or mechanism for implementing a RAKE receiver to combat noise, fading, and to a certain degree, co-channel interference. In accordance with an embodiment of the invention, each of the MRCs 312a, . . . , 312n may comprise suitable logic, circuitry and/or code that may be adapted to combine signals coherently and noise incoherently utilizing the maximum ratio combining algorithm. Each of the MRCs 312a, . . . , 312n may be adapted to utilize the same proportionality constant for the channels. Other optimal combining algorithms such as, for example, minimum mean square error (MMSE) algorithm, may also be utilized. U.S. application Ser. No. 11/173,870 provides a detailed description of an MRC and is hereby incorporated herein by reference in its entirety.

The despreader block 314 may comprise a plurality of despreaders, namely 314a, . . . , 314n. Each of the despreaders 314a, . . . , 314n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The despreader block 314 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the receiver, the original symbol may be extracted. WCDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 310, and the MRC.block 312, the despreader block 314 may be assigned on a per base station basis, with the MRC block 312 communicating with the despreader block 314 that may be assigned to the same base stations.

The DP block 316 may comprise a plurality of DPs 316a, . . . , 316n. Each of the DPs 316a, . . . , 316n may comprise suitable logic, circuitry, and/or code that may be adapted to combine signals transmitted in diversity mode by multiple antennas at the same base station, for example, the transmit antennas 204a and 204b. The diversity modes may comprise OL, CL1 and CL2. The macrocell combiner 318 may comprise suitable logic, circuitry, and/or code that may be adapted to combine signals from adjacent base stations. A macroscopic diversity scheme may be utilized for combining two or more long-term log-normal signals, which may be obtained via independently fading paths received from two or more different antennas at different base stations. The macrocell combiner 318 may be utilized, for example, when a plurality of adjacent base stations transmits the same information for soft handoff.

The convolutional decoder block 320 may comprise suitable logic, circuitry, and/or code that may be adapted to decode convolutional codes as indicated in the 3GPP specification. The output of the convolutional decoder block 320 may be a digital signal that contains voice information, such that the digital signal may suitable for processing by a vocoder or other voice processing device or system. The turbo decoder block 322 may comprise suitable logic, circuitry, and/or code that may be adapted to handle decoding of turbo codes as indicated in the 3GPP specification. The output of the turbo decoder block 322 may be digital data that may be suitable for use by, for example, a video display processor.

In operation, the digital baseband processor block 226 may receive a digital signal from the ADC 224 (FIG. 2). This digital signal may be processed by pairs of CPPs in the CPP block 310 to produce combined time varying impulse response estimates $\hat{h}_1$ and $\hat{h}_2$, along with the timing information T on a per base station basis. The combined time varying impulse response channel estimates $\hat{h}_1$, $\hat{h}_2$ and the timing information T per base station may then be communicated to the SWG 228 (FIG. 2) and the SWG 228 may generate the single weight signal 230 (FIG. 2) that may be communicated to the phase shifter 218 (FIG. 2). The combined time varying impulse response estimates $\hat{h}_1$ and $\hat{h}_2$ and the timing information T may also be communicated to the MRC block 312 for processing. The MRC block 312 may be adapted to utilize the channel estimates $\hat{h}1$, $\hat{h}2$ and timing information T per base station, as well as the digital signal from the ADC 224, to produce an estimated output signal. The estimated output signal may be communicated to the despreader block 314.

The despreader block 314 may be adapted to despread and generate output data estimates on a per base station basis. The despreader block 314 may utilize inputs communicated from the MRC block 312 and from the CPP block 310 to generate the output estimates. The output estimates from the despreader block 314 may be communicated to the DP block 316. The DP block 316 may be adapted to provide diversity processing and generate output data estimates on a per base station basis. The DP block 316 may utilize inputs communicated from the MRC block 312 to generate output data estimates. The DP block 316, which may be adapted to provide diversity processing on a per base station basis, may combine diversity signals from a plurality of transmit antennas, for example, the transmit antennas 204a and 204b, so as to generate the output data estimate of the original data x1, x2, . . . , xn, that was transmitted.

The macrocell combiner block 316 may achieve macroscopic diversity, for example, during soft handoff, when several adjacent base stations may be transmitting the same information. The macrocell combiner block 316 may be adapted to combine the information from the different base stations that may be the same information. The convolutional decoder block 320 may be adapted to convolutional decode the signal generated from the macrocell combiner block 318. The output of the convolutional decoder block 320 may be a voice signal suitable for processing by a voice processor, for example, a vocoder. The turbo decoder block 322 may be adapted to execute turbo decoding on the signal from the macrocell combiner block 318. The output of the turbo decoder block 322 may be a data signal suitable for processing, for example, by a display processor that may visually display the information in the data signal.

Figure 4:
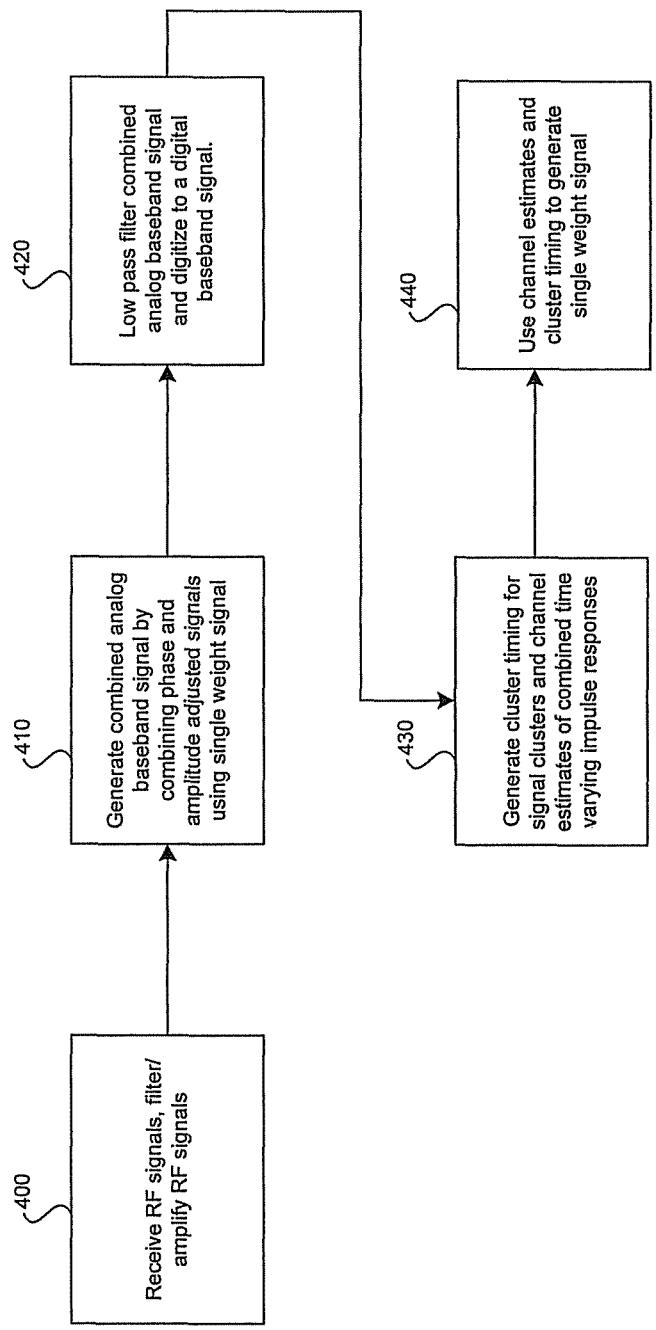
FIG. 4 is an exemplary flow diagram illustrating generation and use of single weight, in accordance with an embodiment of the invention.

FIG. 4 is an exemplary flow diagram illustrating generation and use of single weight signal, in accordance with an embodiment of the invention. Referring to FIG. 4, in step 400, a plurality of RF signals is received, and the plurality of RF signals is filtered and/or amplified. In step 410, mixers are utilized to downconvert the plurality of RF signals to analog baseband signals and at least one single weight signal is utilized to adjust a gain and/or a phase of at least one of the analog baseband signals. The analog baseband signals are combined to form a combined analog baseband signal. In step 420, the combined analog baseband signal is low-pass filtered and converted to a digital baseband signal. In step 430, a digital baseband processor generates timing for signal clusters and channel estimates for the time varying impulse responses from the digital baseband signals. In step 440, a single weight generator utilizes the timing for signal clusters and channel estimates to generate the single weight signal that may be utilized to adjust the gain and/or the phase of the analog baseband signals.

Referring to FIGS. 2, 3, and 4, the steps 400 to 440 may be utilized to generate and use the single weight signal 230. A receiver may comprise multiple RF processing paths such as, for example, the RF processing path that may include the receive antenna 205a, the BPF 206, the LNA 208 and the mixer 210, and the RF processing path that may include the receive antenna 205b, the BPF 212, the LNA 214 and the mixer 216. Since the RF signals received by receive antennas, for example, the receive antennas 205a and 205b, may need to be combined, it may be desirable to adjust the phases of the RF signals in at least one of the plurality of RF processing path so that all of the RF signals are substantially in phase. Similarly, the amplitudes of the RF signals may be adjusted so that they are of similar amplitudes.

In step 400, the receive antennas 205a and 205b may receive transmitted RF signals. The RF signals may be filtered by the BPFs 206 and 212, respectively. The filtered RF signals may then be amplified by the LNAs 208 and 214, respectively, and the amplified RF signals may be communicated to the mixers 210 and 216, respectively. In step 410, the phase and amplitude of an output analog baseband signal of the mixer 210 may not be adjusted, however, the phase and/or the amplitude of an output analog baseband signal of the mixer 216 may be adjusted. The analog baseband signal at the output of the mixer 216 may have substantially similar phase and amplitude as the analog baseband signal at the output of the mixer 210. These analog baseband signals may then be combined.

The mixer 216 may be adapted to mix the filtered RF signal and a local oscillator signal to generate an analog baseband signal. However, in order to adjust the phase or gain of the resulting analog baseband signal, the phase and/or amplitude of either the RF signal or the local oscillator signal may have to be adjusted. If the filtered RF signal is to be adjusted, then circuitry may be provided to process the filtered RF signal. This may add an insertion loss to the filtered RF signal. Therefore, it may be desirable to adjust the phase and/or amplitude of the local oscillator signal.

The output of a VCO 220, which may be the local oscillator signal, may be communicated to a phase adjuster 218. The phase shifter block 218 may adjust the phase and/or amplitude of the local oscillator signal as indicated by a single weight signal, which may be communicated from a SWG 228. The adjusted local oscillator signal may be communicated to the mixer 216 from the phase shifter block 218, and the adjusted local oscillator signal may be mixed with the filtered RF signal from the LNA 214. The analog baseband signal at the output of the mixer 216 may be substantially in phase with the analog baseband signal at the output of the mixer 210, and the amplitudes of both analog baseband signals may be substantially the same. The two analog baseband signals may then be combined, and the combined analog baseband signal may be further processed.

In step 420, the combined analog baseband signal may be low-pass filtered by an LPF 222 to remove undesired noise. This filtered analog baseband signal may be communicated to an ADC 224 where the ADC 224 may sample the filtered analog baseband signal at a pre-determined frequency. The output of the ADC 224 may be a digital baseband signal.

In step 430, the digital baseband signal may be communicated to the digital baseband processor 226. The digital baseband processor 226 may process the digital baseband signals as clusters of signals, and may generate timing signals for the signal clusters and also estimate combined time varying impulse responses for the signals in the signal clusters. The digital baseband processor 226 may also generate a voice signal 232 that may be further processed, for example, by a vocoder or other voice processing device or system. The digital baseband processor 226 may also generate a data signal 234 that may be further processed, for example, by a display processor.

In step 440, the timing signals for the signal clusters and estimated combined time varying impulse responses may be communicated to a SWG 228. The SWG 228 may utilize the information in the timing signals and in the estimated combined time varying impulse responses in order to generate a single weight signal 230. The single weight signal 230 may contain information that may be utilized to adjust the phase and/or the amplitude of the filtered RF signal communicated to the mixer 216.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a plurality of received signals in a receiver that each corresponds to a respective RF chain and antenna, comprising:
    adjusting, by circuitry, a phase of a local oscillator signal based on at least one control signal to provide an adjusted local oscillator signal;
    mixing the adjusted local oscillator signal with a first of the plurality of received signals to provide a first down-converted signal;
    mixing the local oscillator signal with a second of the plurality of received signals to provide a second down-converted signal;
    combining the first down-converted signal with the second down-converted signal to provide a combined signal;
    providing, by a processor, a first output signal based on the combined signal, wherein the first output signal comprises channel estimates and a timing signal that specifies a location of signal clusters; and
    generating by a weight generator, the at least one control signal based on the first output signal and sending the at least one control signal to the circuitry, a first RF chain and a second RF chain.

2. The method according to claim 1, wherein the at least one control signal is used to control the first of the plurality of received signals in a WCDMA system.

3. The method according to claim 1, wherein the at least one control signal is used to control the first of the plurality of received signals in a HSDPA system.

4. The method according to claim 3, wherein the HSDPA system co-exists on a same carrier as WCDMA services or UMTS services.

5. The method according to claim 1, wherein generating the at least one control signal further comprises using at least one optimization algorithm, wherein the at least one optimization algorithm includes one or more of the following: a maximum signal-to-noise ratio (SNR) algorithm, a maximum signal-to-interference-and-noise ratio (SINR) algorithm, and a minimum bit error rate (BER) algorithm.

6. The method according to claim 1, wherein the circuitry continuously adjusts the phase of the local-oscillator signal.

7. The method according to claim 1, wherein the processor comprises a maximum ratio combiner, a despreader, a diversity processor and a cell combiner, wherein the despreader and the diversity processor are communicatively disposed between the maximum ratio combiner and the cell combiner.

8. The method according to claim 1, wherein the adjusting of the phase of the local oscillator signal increases a signal to noise ratio of the combined signal.

9. The method according to claim 1, wherein the processor provides a second output signal and a third output signal based on the combined signal, wherein the second output signal of the processor includes a voice signal, and wherein the third output signal of the processor includes a data signal.

10. The method according to claim 1, wherein the weight generator is communicatively disposed between the circuitry and the processor.

11. The method according to claim 1, wherein the receiver is part of a MIMO communications system.

12. A wireless communications device for processing a plurality of received signals that each corresponds to a respective RF chain and antenna, comprising:
    circuitry configured to adjust a phase of a local oscillator signal based on at least one control signal to provide an adjusted local oscillator signal;
    a first mixer configured to mix the adjusted local oscillator signal with a first of the plurality of received signals to provide a first down-converted signal;
    a second mixer configured to mix the local oscillator signal with a second of the plurality of received signals to provide a second down-converted signal;
    a combining node configured to combine the first down-converted signal with the second down-converted signal to provide a combined signal;
    a processor configured to receive the combined signal and provide, based on at least the combined signal, a first output signal that includes channel estimates and a timing signal that specifies a location of signal clusters; and
    a weight generator configured to generate the at least one control signal based on the first output signal and send the at least one control signal to the circuitry, a first RF chain and a second RF chain.

13. The wireless communications device according to claim 12, wherein the channel estimates and the timing signal are provided on a per-base-station basis.

14. The wireless communications device according to claim 12, wherein the processor is configured to provide a second output signal and a third output signal based on the received combined signal, wherein the second output signal includes a voice signal, and wherein the third output signal includes a data signal.

15. The wireless communications device according to claim 12, wherein the weight generator is further configured to generate the at least one control signal using at least one optimization algorithm, wherein the at least one optimization algorithm includes one or more of the following: a maximum signal-to-noise ratio (SNR) algorithm, a maximum signal-to-interference-and-noise ratio (SFNR) algorithm, and a minimum bit error rate (BER) algorithm.

16. A wireless communications device for processing a plurality of received signals that each corresponds to a respective RF chain and antenna, comprising:
    circuitry configured to adjust a phase of a local oscillator signal based on at least one control signal to provide an adjusted local oscillator signal;
    a first mixer configured to mix the adjusted local oscillator signal with a first of the plurality of received signals to provide a first down-converted signal;
    a second mixer configured to mix the local oscillator signal with a second of the plurality of received signals to provide a second down-converted signal;
    a combining node configured to combine the first down-converted signal with the second down-converted signal to provide a combined signal;
    a processor configured to receive the combined signal and provide, based on at least the combined signal, a first output signal that includes channel estimates and a timing signal that specifies a location of signal clusters, a second output signal that includes a voice signal, and a third output signal that includes a data signal; and
    a weight generator configured to generate the at least one control signal based on the first output signal.

17. The wireless communications device according to claim 16, wherein the channel estimates and the timing signal are provided on a per-base-station basis.

18. The wireless communications device according to claim 16, wherein the weight generator is further configured to send the at least one control signal to a first RF chain and a second RF chain.

19. The wireless communications device according to claim 16, wherein the weight generator is further configured to generate the at least one control signal using at least one optimization algorithm, wherein the at least one optimization algorithm includes one or more of the following: a maximum signal-to-noise ratio (SNR) algorithm, a maximum signal-to-interference-and-noise ratio (SINR) algorithm, and a minimum bit error rate (BER) algorithm.

\* \* \* \* \*

UNITED STATES PATENT AND TRADEMARK OFFICE
CERTIFICATE OF CORRECTION

PATENT NO. : 8,477,803 B2
APPLICATION NO. : 13/324275
DATED : July 2, 2013
INVENTOR(S) : Mark Kent It is certified that error appears in the above-identified patent and that said Letters Patent is hereby corrected as shown below:

In the Claims

Column 18, Line 14, Claim 15, please replace "(SFNR)" with --(SINR)--.

Signed and Sealed this
Fifth Day of November, 2013

Teresa Stanek Rea
*Deputy Director of the United States Patent and Trademark Office*